US006887919B2

(12) United States Patent
Krawinkel et al.

(10) Patent No.: US 6,887,919 B2
(45) Date of Patent: May 3, 2005

(54) PRESSURE SENSITIVE ADHESIVE AND ITS PREPARATION

(75) Inventors: Thorsten Krawinkel, Hamburg (DE); Bernd Lühmann, Norderstedt (DE); Renke Bargmann, Hamburg (DE)

(73) Assignee: tesa AG, Hamburg (DE)

( * ) Notice: Subject to any disclaimer, the term of this patent is extended or adjusted under 35 U.S.C. 154(b) by 0 days.

(21) Appl. No.: 10/357,069

(22) Filed: Feb. 3, 2003

(65) Prior Publication Data

US 2003/0215660 A1 Nov. 20, 2003

(30) Foreign Application Priority Data

Mar. 19, 2002 (DE) .......................................... 102 12 049

(51) Int. Cl.$^7$ .............................................. C08L 53/02
(52) U.S. Cl. ...................... 522/111; 428/521; 522/112; 156/334; 528/88; 528/89; 528/95; 528/901; 528/914
(58) Field of Search ........................... 525/88, 95, 901, 525/914; 156/334; 428/521; 522/111, 112

(56) References Cited

U.S. PATENT DOCUMENTS

| | | | |
|---|---|---|---|
| 4,024,312 A | 5/1977 | Korpman .................... 428/343 |
| 4,133,731 A | 1/1979 | Hansen et al. ............... 204/159 |
| 4,820,746 A | 4/1989 | Rice et al. .................. 522/127 |
| 5,409,189 A | 4/1995 | Lühmann et al. ........ 248/205.3 |
| 5,491,012 A | 2/1996 | Lühmann et al. ............. 428/40 |
| 5,507,464 A | 4/1996 | Hamerski et al. ............ 248/683 |
| 5,626,931 A | 5/1997 | Lühmann et al. .......... 428/40.1 |
| 5,626,932 A | 5/1997 | Lühmann et al. .......... 428/40.1 |
| 5,672,402 A | 9/1997 | Kreckel et al. ............ 428/34.2 |
| 5,750,607 A | 5/1998 | Gerard et al. ............... 524/271 |
| 5,897,949 A | 4/1999 | Lühmann et al. ............ 428/317.3 |
| 5,925,459 A | 7/1999 | Zimmermann et al. ..... 428/354 |
| 5,948,527 A * | 9/1999 | Gerard et al. ......... 428/355 BL |
| 5,967,474 A | 10/1999 | doCanto et al. ............ 248/205 |
| 6,004,665 A | 12/1999 | Lühmann et al. ........ 428/317.3 |
| 6,086,973 A | 7/2000 | Hazes ....................... 428/40.1 |
| 6,106,953 A | 8/2000 | Zimmerman et al. ....... 428/440 |
| 6,136,397 A | 10/2000 | Lühmann et al. .......... 428/40.1 |
| 6,172,145 B1 | 1/2001 | Drieskens et al. ............ 524/68 |
| 6,184,285 B1 | 2/2001 | Hatfield et al. .............. 524/505 |
| 6,245,177 B1 | 6/2001 | Lühmann .................... 156/182 |
| 6,280,840 B1 | 8/2001 | Lühmann et al. ........... 428/343 |
| 6,284,378 B1 | 9/2001 | Junghans et al. ........... 428/421 |
| 6,395,389 B1 | 5/2002 | Lühmann et al. ........... 428/343 |

FOREIGN PATENT DOCUMENTS

| | | | |
|---|---|---|---|
| DE | 33 31 016 C2 | 10/1984 | .............. C09J/5/00 |
| DE | 33 31 061 A1 | 3/1985 | ............ A16N/1/42 |
| DE | 42 33 872 C2 | 7/1994 | .............. C09J/7/02 |
| DE | 44 28 587 C2 | 6/1996 | .............. C09J/7/02 |
| DE | 44 31 914 C2 | 10/1996 | .............. C09J/7/02 |
| DE | 195 31 696 A1 | 3/1997 | .............. C09J/7/02 |
| DE | 195 11 288 C2 | 4/1997 | .............. C09J/5/00 |
| DE | 296 23 112 U1 | 12/1997 | .............. C09J/7/02 |
| DE | 197 08 366 A1 | 1/1998 | .............. C09J/7/02 |
| DE | 197 29 706 A1 | 3/1998 | .............. C09J/7/02 |
| DE | 196 37 223 A1 | 4/1998 | .............. C09J/7/02 |
| DE | 196 49 636 A1 | 6/1998 | .............. C09J/7/02 |
| DE | 196 49 727 A1 | 6/1998 | .............. C09J/7/02 |
| DE | 196 49 728 A1 | 6/1998 | .............. C09J/7/02 |
| DE | 196 49 729 A1 | 6/1998 | .............. C09J/7/02 |
| DE | 197 08 364 A1 | 9/1998 | .............. C09J/7/02 |
| DE | 297 23 198 U1 | 10/1998 | ............ B42D/9/00 |
| DE | 197 20 145 A1 | 11/1998 | .............. C09J/7/02 |
| DE | 197 23 177 A1 | 12/1998 | ......... H01L/31/101 |
| DE | 198 13 081 A1 | 1/1999 | .............. C09J/5/02 |
| DE | 197 56 816 C1 | 2/1999 | ............ A47G/1/06 |
| DE | 297 23 614 U1 | 3/1999 | .............. C09J/7/02 |
| DE | 197 56 084 A1 | 7/1999 | .............. C09J/7/00 |
| DE | 198 20 858 A1 | 11/1999 | .............. C09J/7/02 |
| DE | 42 22 849 C2 | 2/2000 | .............. C09J/7/00 |
| DE | 198 42 864 A1 | 3/2000 | .............. C09J/7/00 |
| DE | 198 42 865 A1 | 3/2000 | .............. C09J/7/02 |
| DE | 199 38 693 A1 | 2/2001 | .............. C09J/7/02 |
| DE | 199 55 610 A1 | 6/2001 | .............. C09J/7/02 |
| DE | 100 03 318 A1 | 8/2001 | ........... C09J/153/02 |
| EP | 0 447 855 A2 | 9/1991 | .............. C09J/7/02 |
| EP | 0 643 732 B1 | 8/1996 | ......... C08F/297/04 |
| EP | 0 832 588 A2 | 4/1998 | ............ A47G/1/17 |
| WO | WO 92/11332 | 7/1992 | .............. C09J/7/02 |
| WO | WO 92/11333 | 7/1992 | .............. C09J/7/02 |
| WO | WO 94/21157 | 9/1994 | ............ A47G/1/17 |
| WO | WO 95/06691 | 3/1995 | .............. C09J/7/02 |
| WO | WO 97/07172 | 2/1997 | .............. C09J/7/02 |
| WO | WO 98/03601 | 1/1998 | .............. C09J/7/02 |
| WO | WO 99/31193 | 6/1999 | .............. C09J/7/02 |
| WO | WO 99/37729 | 7/1999 | .............. C09J/7/02 |
| WO | WO 99/63018 | 12/1999 | .............. C09J/7/02 |
| WO | WO 00/12644 | 3/2000 | .............. C09J/7/02 |
| WO | WO 200022062 A1 * | 4/2000 | .............. C09J/4/06 |
| WO | WO 01/55276 | 8/2001 | |
| WO | WO 00/22062 | 4/2003 | |

* cited by examiner

Primary Examiner—Margaret G. Moore
Assistant Examiner—Marc S. Zimmer
(74) Attorney, Agent, or Firm—Norris McLaughlin & Marcus PA

(57) ABSTRACT

A pressure sensitive adhesive composed of a mixture comprising
a) a styrene block copolymer having a star-shaped structure and a molecular weight $M_w$ of more than 300,000 g/mol, or having elastomer blocks which contain more than 30% by weight of 1,2-linked diene in their block structure, or both, and which is crosslinkable by exposure to UV-light or electron beams, and
b) one or more block copolymers composed of vinylaromatic blocks and elastomer blocks, the block polyvinylaromatic content being greater than 20%, and
c) one or more tackifier resins.

19 Claims, No Drawings

PRESSURE SENSITIVE ADHESIVE AND ITS PREPARATION

The invention relates to a pressure sensitive adhesive (PSA) based on styrene block copolymers with elastomer blocks which can be used in particular for PSA film strips for producing a bond which can be released again by stretching in the direction of the bonding plane.

The invention further relates to a PSA film strip produced from a PSA mixture of this kind and also to a process for producing a PSA mixture and also to the use of a PSA mixture.

BACKGROUND OF THE INVENTION

Highly elastically or plastically stretchable self-adhesive tapes which can be detached again without residue or destruction by stretching in the bonding plane are known, for example, from U.S. Pat. No. 4,024,312 A, DE 33 31 016 C2, WO 92/11332 A1, WO 92/11333 A1, DE 42 22 849 A1, WO 95/06691 A1, DE 195 31 696 A1, DE 196 26 870 A1, DE 196 49 727 A1, DE 196 49 728 A1, DE 196 49 729 A1, DE 197 08 364 A1, DE 197 20 145 A1, DE 198 20 858 A1, WO 99/37729 A1 and DE 100 03 318 A1 and are referred to inter alia below as strippable self-adhesive tapes.

Strippable self-adhesive tapes of this kind are frequently used in the form of single- or double-sided PSA film strips, which preferably have a nonadhesive grip region from which the detachment operation is initiated. Particular applications of such self-adhesive tapes can be found, inter alia, in DE 42 33 872 A1, DE 195 11 288 A1, U.S. Pat. No. 5,507,464 A, U.S. Pat. No. 5,672,402 A and WO 94/21157 A1. Specific embodiments are also described in DE 44 28 587 A1, DE 44 31 914 A1, WO 97/07172 A1, DE 196 27 400 A1, WO 98/03601 A1 and DE 196 49 636 A1, DE 197 20 526 A1, DE 197 23 177 A1, DE 197 23 198 A1, DE 197 26 375 A1, DE 197 56 084 A1, DE 197 56 816 A1, DE 198 42 864 A1, DE 198 42 865 A1, WO 99/31193 A1, WO 99/37729 A1, WO 99/63018 A1, WO 00/12644 A1, and DE 199 38 693 A1.

Preferred fields of use of the above-mentioned strippable adhesive film strips include in particular the residuelessly and nondestructively redetachable fixing of light to moderately heavy articles in the home, workplace and office segments. In these applications they replace conventional fastenings means, such as drawing pins, roundhead needles, thumbtacks, nails, screws, conventional self-adhesive tapes and liquid adhesives, for example. Key to the successful use of the above-mentioned adhesive film strips is not only the quick and easy bonding and the secure hold they provide for the envisaged period of bonding but also the possibility for residueless and nondestructive redetachment of bonded articles. It should be borne in mind in particular here that the adhesive strips must function on a large number of substrates in order to be able to serve as a universal fixing means in the home, workplace, and office segments.

Despite the fact that the patent literature cited above describes a broad range of pressure sensitive adhesives for use in strippable self-adhesive tapes, commercial products currently on the market (for example, tesa® Powerstrips® from Beiersdorf AG, 3 M Comand® Adhesive strips from 3M, and Plastofix® Formule Force 1000 adhesive strips from Plasto S.A.) all have pressure sensitive adhesives based on styrene block copolymers, generally with unsaturated polydiene blocks in the elastomer block. Typically, use is made of linear or radial block copolymers based on polystyrene blocks and polybutadiene blocks and/or polyisoprene blocks; i.e., for example, radial styrene-butadiene $(SB)_n$ and/or linear styrene-butadiene-styrene (SBS) and/or linear styrene-isoprene-styrene (SIS) block copolymers. Advantages of the aforementioned styrene block copolymer based pressure sensitive adhesives for use in strippable self-adhesive tapes are, for example, the very high bond strengths which can be achieved with them (owing, inter alia, to the simultaneous realization of very high cohesion and very high bond strengths), pronounced reduction of tack during stretching detachment (which greatly facilitates, if not indeed being a precondition for, the operation of detachment), and a very high tensile strength, which is essential in particular for an operation of detachment with no tearing.

The products available on the market, all of which utilize pressure sensitive adhesives based on styrene block copolymers, exhibit weaknesses in bond strength at temperatures above 50° C. As a result of softening of the hard phases, which consist principally of polystyrene (block polystyrene domains), the PSA strips fail cohesively particularly when used to bond moderately heavy articles.

Failure of the bond occurs to a much greater extent in the case of a tip shearing load (where a torque is active, such as in the case of the bonding of a hook, for example) than in the case of a simple shearing load.

It is an object of the invention, therefore, to provide an improved pressure sensitive adhesive based on styrene block copolymers for pressure sensitive adhesive film strips which can be redetached without residue or destruction by stretching in the direction of the bonding plane and which exhibit a good bond strength even at elevated temperature.

SUMMARY OF THE INVENTION

The invention accordingly provides a pressure sensitive adhesive comprising a mixture of:

a styrene block copolymer having a star-shaped structure and a molecular weight $M_w$ of more than 300,000 g/mol, or having elastomer blocks which contain more than 30% by weight of 1,2-linked diene in their block structure, or both, and which is crosslinkable by exposure to UV-light or electron beams, and one or more block copolymers having polyvinylaromatic blocks and elastomer blocks, the polyvinylaromatic block content being greater than 20% by weight, and one or more tackifier resins.

DETAILED DESCRIPTION

The crossslinking of the styrene block copolymers in the elastomer blocks can be carried out, for example, by ultraviolet (UV) irradiation or using electron beams. It has surprisingly been found that this radiation-chemical crosslinking enhances the cohesive properties of the PSA mixture at high temperatures while at the same time the strippability is retained.

For strippable adhesive tapes to be redetachable readily and without residue, they must possess certain mechanical properties. The ratio of tensile strength to stripping force must be greater than two, preferably greater than three. The stripping force is the force that has to be exerted in order to remove an adhesive strip from a joint by parallel pulling in the direction of the bonding plane. The ratio of stripping force to tensile force is greatly influenced by the thickness of the adhesive strips, since the peel force required for detachment is composed of the force needed to detach the adhesive tape from the bond substrates and the force which must be exerted in order to deform the adhesive tape. The force needed to deform the adhesive tape is approximately proportional to the thickness of the adhesive tape. The peel force required for detachment can be assumed for simplification to be constant within the thickness range in question. The tensile strength, on the other hand, rises in proportion to the thickness of the adhesive strip. It follows from this that, for self-adhesive tapes having a single-layer construction, as disclosed in DE 33 31 016 C2, the tensile strength will become less than the peel force below a certain thickness. Above a certain thickness, in contrast, the ratio of peel force to stripping force will become greater than two. If, however, the tensile strength of the polymers used is very low, it follows from this that the thickness must become very large, as a result of which the stripping forces will increase too. In order to prevent the force required for stripping becoming too great, however, the stripping force per adhesive strip should not be greater than 30 N.

Although radiation-chemical crosslinking does somewhat increase the tensile strength, it is not sufficiently high, when use is made exclusively of the above-mentioned readily crosslinkable block copolymers as elastomers, to realize strippable adhesive strips which can be redetached without tearing and have a single-layer construction.

Since the adhesion performance is insufficient to hold moderately heavy articles, particularly at high temperatures, owing to the high diblock content and/or the comparatively low block polystyrene content, it is also not possible to realize multilayer constructions having a middle layer possessing high tensile strength, as are disclosed in WO 92/11333 A1.

Surprisingly, by blending a readily crosslinking elastomer described above with a styrene block copolymer having a high triblock content and high block polystyrene content, and given a choice of suitable resins, it is possible to achieve good adhesion properties at elevated temperatures. Both cohesion and adhesion can be increased to such an extent that very good bonding performances are made possible even, for example, at +80° C. Surprisingly, the special properties of the adhesives, which are needed particularly for the stripping operation, such as high stretchability and very substantial loss of adhesion in the stretched state, are retained, so that the crosslinked PSAs can be used in strippable self-adhesive tapes.

As a result of crosslinking with UV or electron beams, as described above, the tensile strengths are markedly increased, while the stripping forces for parting the adhesive bond become insignificantly larger; the ratio of tensile strength to stripping force becomes more favorable as a result of crosslinking, while the tendency to tear goes down.

It is therefore preferred to use styrene block copolymers having a radial, star-shaped or linear construction and a relatively high polystyrene content of from about 20 to 40% by weight, preferably from 25 to 35% by weight. It is particularly advantageous if the styrene block copolymers have a triblock content of more than 60% by weight, preferably more than 75% by weight.

The crosslinking of the elastomer blocks in accordance with the invention may take place either by way of UV radiation or else with the aid of electron beams. As described in the literature, the cohesive properties of pressure sensitive adhesives based on styrene block copolymers can be improved at high temperatures if the polymers are subjected to radiation-chemical crosslinking in the elastomer part. Despite the fact that the majority of styrene block copolymers contain polyisoprene or polybutadiene as elastomer blocks and therefore contain a large number of double bonds, the low molar mass of the majority of these elastomers means that they require a very high radiation dose in order to develop a sufficiently high cohesion. Therefore, special styrene block copolymers were developed which can be crosslinked particularly easily by means of UV or electron beams. Particularly suitable for crosslinking are systems which possess a very high molar mass and/or contain a large amount of 1,2-linked dienic monomer units in the elastomer block. The company Kraton Polymers offers corresponding special polymers for radiation-chemical crosslinking, firstly Kraton DKX 222, a radial $(SB)_2B_2$ with 1,2-linked polybutadiene present in the elastomer part, and secondly Kraton D 1320, a high molecular mass, star-shaped styrene-isoprene-block copolymer. Since a low polystyrene content is of great advantage for the tack, especially the initial tack, these two elastomers possess only 18% and 10% block polystyrene respectively.

As a result of their low block polystyrene content and the high diblock content, the tensile strength of the readily crosslinkable polymers is very low. In addition, the bond strength of formulated pressure sensitive adhesives based on the aforementioned elastomers is substantially lower than when triblock copolymers with block polystyrene contents of, for example, 25% or more are used.

Surprisingly it has been found that by blending a readily crosslinking elastomer with a styrene block copolymer having this high block polystyrene content of from about 20 to 40% by weight, preferably from 25 to 35% by weight, and a high triblock content of more than 60% by weight, preferably more than 75% by weight, and when using an appropriate resin, good adhesion properties are achieved at elevated temperatures, it being possible to increase both cohesion and adhesion such that very good bonding performances are enabled even at temperatures of about 80° C. The special properties of the PSA mixture, which are needed particularly for the stripping operation, such as high stretchability and very substantial loss of adhesion in the stretched state, are retained, so that the crosslinked PSA mixture can be used in strippable self-adhesive tapes.

The styrene block copolymers may be formed of styrene-butadiene block copolymers or styrene-isoprene block copolymers. It is also possible, however, to use block copolymers which utilize further polydiene-containing elastomer blocks, such as copolymers of two or more different 1,3-dienes, for example. In accordance with the invention it is also possible, however, to use further functionalized block copolymers, such as styrene block copolymers modified with maleic anhydride or with silane, for example.

Instead of the above-described polystyrene blocks it is also possible to use polymer blocks based on other aromatics-containing homopolymers or copolymers, having glass transition temperatures of more than about 75° C. As homopolymers and copolymers it is preferred to use C-4 to C-12 aromatics. Examples of suitable polymer blocks are aromatics blocks containing alpha-methylstryrene.

It is, however, also possible to utilize polymer blocks based on (meth)acrylate homopolymers, (meth)acrylate copolymers having glass transition temperatures of more than 75° C. In this context it is possible to employ not only block copolymers utilizing solely hard blocks based on (meth)acrylate polymers but also block copolymers which utilize not only polyaromatics blocks, such as polystyrene blocks, but also poly(meth)acrylate blocks.

The pressure sensitive adhesive preferably has a styrene block copolymer content of 20 to 70% by weight, more preferably from 30 to 60% by weight, and with particular preference from 35 to 55% by weight.

The pressure sensitive adhesive may conventionally have further blending components, such as tackifier resins, aging inhibitors, processing aids, dyes, optical brighteners, stabilizers, etc. The nature and amount of the blending components may be selected as required.

It is particularly advantageous if the pressure sensitive adhesive comprises crosslinking promoters, especially electron beam crosslinking promoters based on polyfunctional acrylates or thiols, or UV crosslinkers. The crosslinking promoters are used to raise the radiation yield for the radiation-chemical crosslinking.

The object is further achieved by the pressure sensitive adhesive film strip which is composed of a pressure sensitive adhesive of the invention.

The object is additionally achieved by the process for preparing a pressure sensitive adhesive of the invention by crosslinking the polymers in the elastomer block of the styrene block copolymer.

The object is further achieved by the use of the pressure sensitive adhesive of the invention for strippable pressure sensitive adhesive sheets.

The invention is illustrated with reference to a number of working examples.

The PSA mixture of the invention is based on defined mixtures of selected specific styrene block copolymers. The tack of these polymer mixtures is brought about by adding tackifer resins which are miscible with the elastomer phase. Further possible blending components include aging inhibitors, processing aids, dyes, optical brighteners, and also, where appropriate, further polymers, preferably elastomeric in nature.

Styrene block copolymer mixtures of the invention comprise:

A first styrene block copolymer, which by virtue of a specific structure can be crosslinked readily by UV or electron beams. This may on the one hand be block copolymers having a high fraction of 1,2-linked polybutadiene or polyisoprene, which have a large number of terminal double bonds in the main chain or in a side chain, or, on the other hand, high molecular mass styrene block copolymers having a star-shaped structure and a low styrene content.

One or more further styrene block copolymers having a radial, star-shaped or linear structure and a high polystyrene fraction of about 20 to 40% by weight, preferably 25 to 35% by weight, and a high triblock content of more than 60% by weight, preferably more than 75% by weight. The styrene block copolymers may be constructed on the basis either of styrene-isoprene-styrene (SIS) or of styrene-butadiene-styrene (SBS). Mixtures of these two can likewise be used. It is also possible to employ elastomers which are partly or fully hydrogenated in the elastomer block.

The fraction of the first elastomer in the total amount of elastomers should be between 20 and 80%, preferably between 30 and 70%.

Instead of a polystyrene block it is also possible to use polymer blocks based on other aromatics-containing homopolymers and copolymers (preferably C-8 to C-12 aromatics) having glass transition temperatures of more than 75° C., such as aromatics blocks containing α-methylstyrene for example. Likewise suitable for use are polymer blocks based on (meth)acrylate homopolymers and (meth)acrylate copolymers having glass transition temperatures of more than 75° C. In this context it is possible to employ not only block copolymers which utilize as hard blocks exclusively those based on (meth)acrylate polymers but also those which utilize not only polyaromatics blocks, such as polystyrene blocks, for example, but also poly(meth)acrylate blocks.

Instead of styrene-butadiene block copolymers and styrene-isoprene block copolymers it is likewise possible in accordance with the invention to utilize block copolymers which use further polydiene-containing elastomer blocks, such as copolymers of two or more different 1,3-dienes, for example.

In accordance with the invention it is additionally possible to utilize functionalized block copolymers, such as maleic anhydride-modified or silane-modified styrene block copolymers for example.

Typical use concentrations for the styrene block copolymers are situated in a range between 20 to 70% by weight, preferably in the range between 30 to 60% by weight, with particular preference in the range between 35 to 55% by weight.

Further polymers which may be present include those based on pure hydrocarbons, for example unsaturated polydienes, such as natural or synthesized polyisoprene or polybutadiene, chemically substantially saturated elastomers, such as saturated ethylene-propylene copolymers, α-olefin copolymers, polyisobutylene, butyl rubber, and ethylene-propylene rubber, and also chemically functionalized hydrocarbons, such as halogen-, acrylate- or vinyl ether-containing polyolefins, which may replace up to about 100 phr of the vinylaromatic-containing block copolymers, based on the styrene block copolymer.

The pressure-sensitive adhesion of the PSA may optionally be generated only by thermal activation or by solvent activation.

As tackifiers it is possible to make use, for the PSA, as principal component for example, in particular of hydrogenated and non-hydrogenated hydrocarbon resins and polyterpene resins. Those which are preferably suitable include: hydrogenated polymers of dicyclopentadiene (for example, Escorez 5300 Series; Exxon Chemicals), hydrogenated polymers of C-8 and C-9 aromatics (for example, Regalite and Regalrez Series; Eastman Inc.//Arkon P Series; Arakawa). These may arise through hydrogenation of polymers from pure aromatics streams or else by hydrogenation of polymers based on mixtures of different aromatics. Also suitable are partially hydrogenated polymers of C-8 and C-9 aromatics (for example, Regalite and Regalrez Series; Eastman Inc. // Arkon M; Arakawa), hydrogenated polyterpene resins (for example, Clearon M; Yasuhara), hydrogenated C-5/C-9 polymers (for example, ECR-373; Exxon Chemicals), aromatic-modified, selectively hydrogenated dicyclopentadiene derivatives (for example, Escorez 5600 Series; Exxon Chemicals). The aforementioned tackifer resins may be used alone or in a mixture.

The use of hydrogenated hydrocarbon resins as a blend component for crosslinkable styrene block copolymers, as described for example in EP 0 447 855 A1, U.S. Pat. No. 4,133,731 A and U.S. Pat. No. 4,820,746 A, is particularly appropriate, since the absence of double bonds means that crosslinking cannot be disrupted.

Furthermore, however, it is also possible to use non-hydrogenated resins, if crosslinking promoters are employed, such as polyfunctional acrylates for example.

Particular preference under these conditions is given to the use of terpene resins based on α-pinene (Piccolyte A-Series from Hercules, Dercolyte A-Series from DRT), since these resins ensure not only high cohesion but also very high adhesion even at high temperatures.

However, other non-hydrogenated hydrocarbon resins as well, non-hydrogenated analogs of the hydrogenated resins described above, can be employed. Through the use of crosslinking promoters it is likewise possible to employ resins based on rosin. Owing to their low adhesion at elevated temperatures, these are employed primarily only as blend components.

To stabilize the PSA it is common to add primary antioxidants such as, for example, sterically hindered phenols, secondary antioxidants such as, for example, phosphites or thioethers and/or C-radical scavengers.

As further additives it is typically possible to use light stabilizers, such as UV absorbers and sterically hindered amines, antiozonants, metal passivators, processing auxiliaries and endblock-reinforcing resins.

Plasticizing agents, such as liquid resins, plasticizer oils or low molecular mass liquid polymers, such as low molecular mass polyisobutylene having molar masses of less than 1500 g/mol (numerical average) or liquid EPDM grades, may be used in small amounts of less than 20% by weight.

Fillers, such as silica, glass (ground or in the form of beads), aluminas, zinc oxides, calcium carbonates, titanium dioxides, carbon blacks, etc., and also color pigments and dyes, and also optical brighteners, may likewise be used.

For increasing the beam yield use is made where appropriate of crosslinking promoters for electron beam crosslinking. As crosslinking promoters it is possible, for example, to employ crosslinking promoters based on polyfunctional acrylates or thiols. In the case of UV crosslinking it is necessary to employ UV crosslinkers such as, for example, Irgacure 651 from Ciba Geigy.

The PSAs can be prepared and processed both from solution and from the melt. Particular preference, however, is given to manufacturing the PSAs from the melt, in which case it is possible in particular to use batch methods as well as continuous methods. Particularly advantageous is the continuous manufacture of the PSAs with the aid of an extruder. Following the compounding of the PSAs and subsequent coating, the PSA is crosslinked with the aid of UV radiation or electron beams. For crosslinking with UV radiation the addition of a crosslinker is almost indispensable. In the case of electron beam crosslinking, the use of crosslinking promoters is optional.

Pressure sensitive adhesives of the invention can be used not only for single-layer self-adhesive tapes which are redetachable without residue or destruction by stretching but also for multilayer self-adhesive tapes with or without intermediate foam carriers.

Pressure sensitive adhesives of the invention can be utilized for both single-sidedly and double-sidedly pressure-sensitively adhesive self-adhesive tapes which can be redetached without residue or destruction by stretching. Single-sidedly pressure-sensitively adhesive self-adhesive tapes can be obtained, for example, by neutralizing one side of aforementioned double-sidedly pressure-sensitively adhesive self-adhesive tapes or self-adhesive strips, or by unilateral coating of a highly stretchable backing.

The resultant PSA sheets may be converted to the form of adhesive tape rolls, adhesive strips or punched products. An option is to provide a non-pressure-sensitively adhesive grip-tab region which can be used as the starting point for the detachment operation.

A number of examples of crosslinked strippable pressure sensitive adhesives are given below.

The PSAs were processed here in a heatable kneading apparatus with sigma blade (Werner und Pfleiderer LUK 1,0 K3 fitted with an LTH 303 thermostat from mgw LAUDA) at a temperature of about +160 to +180° C., with chemical $CO_2$ inert gas blanketing, to form a homogeneous mixture. After cooling, the adhesive was compressed at +120° C. to +140° C. in a temperature-controllable press (Type KHL 50 from Bucher-Guyer) for about 10 minutes to produce single-layer adhesive sheet sections with a thickness of 500 μm±50 μm (mean±2-fold standard deviation).

Single-layer PSA strips of the desired dimensions are obtained by die cutting. To produce multilayer PSA strips, the corresponding layers can be joined beforehand by lamination (by hot lamination where appropriate) and then the adhesive strips can be individualized by die cutting. With all of the PSAs, 1% of Ebecryl 140 was added in order to accelerate electron beam crosslinking. The PSA strips coated with PSA were subsequently subjected to electron beam crosslinking with a dose of 80 kGy.

EXAMPLE 1

| 50 Parts | Kraton D 1320 | UV-crosslinkable SIS from Kraton |
| 50 Parts | Foral 105 | hydrogenated rosin ester from Eastman |

EXAMPLE 2

| 50 Parts | Kraton D 1320 | UV-crosslinkable SIS from Kraton |
| 50 Parts | Piccolyte A 115 | α-pinene resin from Hercules |

EXAMPLE 3

| 50 Parts | Kraton DKX 222 | UV-crosslinkable SBS from Kraton |
| 50 Parts | Foral 105 | hydrogenated rosin ester from Eastman |

EXAMPLE 4

| 50 Parts | Kraton DKX 222 | UV-crosslinkable SBS from Kraton |
| 50 Parts | Piccolyte A 115 | α-pinene resin from Hercules |

EXAMPLE 5

| 50 Parts | Kraton D 1165 | SIS with 30% block polystyrene content from Kraton |
| 50 Parts | Piccolyte A 115 | α-pinene resin from Hercules |

EXAMPLE 6

| 50 Parts | Kraton D 1102 | SBS with 30% block polystyrene content from Kraton |
| 50 Parts | Piccolyte A 115 | α-pinene resin from Hercules |

EXAMPLE 7

| 25 Parts | Kraton D 1320 | UV-crosslinkable SIS from Kraton |
| 25 Parts | Kraton D 1165 | SIS with 30% block polystyrene content from Kraton |
| 50 Parts | Piccolyte A 115 | α-pinene resin from Hercules |

EXAMPLE 8

| | | |
|---|---|---|
| 25 Parts | Kraton DKX 222 | UV-crosslinkable SBS from Kraton |
| 25 Parts | Kraton D 1102 | SBS with 30% block polystyrene content from kraton |
| 50 Parts | Piccolyte A 115 | α-pinene resin from Hercules |

In respect of the PSA strips with the exemplary PSA mixtures, the following mechanical and technical adhesive data were determined:

| PSA Example No. | Tensile strength in MPa | Stripping tension in MPa | Peel rate in mm/ 24 h | Tip shear stability time in days | Failure temperature in ° C. |
|---|---|---|---|---|---|
| 1, uncrosslinked | 2.5 | 0.8 | 10 | 2 | 72 |
| 1, crosslinked | 3.1 | 1.1 | >40 | 1 | 87 |
| 2, uncrosslinked | 3.4 | 1.4 | 5 | 3 | 80 |
| 2, crosslinked | 3.7 | 1.5 | 17 | 3 | 93 |
| 3, uncrosslinked | 3.6 | 0.9 | 20 | 1 | 77 |
| 3, crosslinked | 4.1 | 1.1 | >40 | 1 | 92 |
| 4, uncrosslinked | 4.6 | 1.5 | 7 | 4 | 87 |
| 4, crosslinked | 4.9 | 1.5 | 25 | 2 | 101 |
| 5, uncrosslinked | 11.5 | 1.8 | 4 | 31 | 93 |
| 5, crosslinked | 11.7 | 1.8 | 7 | 26 | 97 |
| 6, uncrosslinked | 12.6 | 2.0 | 6 | 45 | 97 |
| 6, crosslinked | 13.2 | 2.1 | 10 | 52 | 101 |
| 7, uncrosslinked | 8.0 | 1.8 | 4 | 18 | 90 |
| 7, crosslinked | 8.5 | 2.4 | 16 | 14 | 110 |
| 8, uncrosslinked | 9.5 | 1.5 | 4 | 24 | 86 |
| 8, crosslinked | 10.9 | 1.9 | 7 | 20 | 108 |

As can be seen from the results, the PSA strips of examples 1 to 4 are well crosslinked. In spite of the crosslinking, however, the tensile strength is still relatively low for these adhesive strips to be able to be used universally. With these specimens there is a significant reduction in bonding performance as a result of crosslinking.

In contrast thereto, crosslinking in the case of the PSA strips of examples 5 and 6 is only very low, as is evident from the small differences in the failure temperature of crosslinked and uncrosslinked specimens.

The PSA strips corresponding to examples 7 and 8 exhibit good crosslinking and sufficient cohesion and adhesion, so that they can be used universally in strippable adhesive strips.

The peel rate at 80° C. of the aforementioned crosslinked adhesive strips was determined as well. Whereas all of the non-crosslinked adhesive strips underwent immediate cohesive failure, the cohesion was considerably increased by crosslinking.

The adhesive strips corresponding to examples 1 to 4 all gave a value of more than 40 mm, with all four adhesive strips failing adhesively. The adhesive strips corresponding to examples 5 and 6 both failed cohesively. As a result of the low level of crosslinking, the cohesion is too low at these elevated temperatures.

A mixture of the elastomers from examples 1 to 4 and of the elastomers from examples 5 and 6 show a significantly altered behavior. The adhesive strips can be crosslinked sufficiently to prevent cohesive fracture at 80° C. On the other hand, the bond strength is sufficient to prevent rapid adhesive peeling as well.

In the case of the adhesive strip in example 7, a peel path of 22 mm was found after 24 hours. In the case of the adhesive strip of example 8 it was only 4 mm.

With a combination of readily crosslinkable elastomers with low block polystyrene content and styrene block copolymers with high block polystyrene content it is therefore possible to produce adhesive sheet strips which are strippable and yet still functional at high temperatures.

The mechanical and technical adhesive data were determined as follows:

Tip Shear Strength

In order to determine the tip shear strength, the test adhesive sheet, which measures 20 mm×50 mm and is provided at one end on both sides with a non-adhesive grip-tab region (obtained by laminating on 25 μm biaxially oriented polyester film measuring 20 mm×30 mm (Hostaphan RN 25)) is bonded to the center of a highly polished square steel plate measuring 40 mm length×40 mm width×3 mm thickness. This steel plate simulates the baseplate of a hook in an especially reproducible fashion.

The steel plate is provided centrally on its back with a 10 cm steel rod which sits vertically on the surface of the plate. The resulting test specimens are bonded to the test substrate, which is likewise a steel surface, with a force of 100 N and a press-on time of 5 seconds and are left for 5 minutes in the unloaded state; that is, are no longer pressed on and are not yet loaded in shearing, tipping and peeling.

The test specimen has thus been prepared.

The test specimen is then loaded: after the chosen tip shear load has been applied by suspending a weight (20 N with 50 mm lever arm), a measurement is made of the time which elapses until the bond fails (i.e., the tip shear stability time). The test conditions are 23° C. and a relative humidity of 50%.

This force and this lever arm produce a torque which is about ten times as high as that which actually occurs with the average user and is produced by a force of about 10 N with a lever arm of about 10 mm.

The approximately 10-fold excess in terms of mechanical load limits the test period to a tolerable level. A rational rate of technical development would not be achievable with tests lasting years. Although it is not possible in this way to draw direct conclusions about the stability times experienced under typical conditions in practice from the stability times determined here, a sequence is nevertheless obtained in the test specimens, ranging from best to worst.

Peel Strength

The test specimens are PSA strips 20 mm wide. For this measurement they are laminated over the entire area of one side with a 23 μm PET film of the aforementioned Hostaphan RN 25 type without air bubbles, after which the second adhesive sheet strip side is lined at one end with a film strip about 6 mm long and likewise of Hostaphan RN 25, thereby forming at this end a non-adhesive grip-tab region on both sides. Thereafter, the adhesive sheet strip under test is bonded by its front side, using gentle finger pressure, to the test substrate.

The test substrate is a woodchip wallpaper, namely the very common type "52" of the brand "Erfurt". This woodchip wallpaper has a medium grain and is composed only of paper and woodchips, containing in particular no foam particles. This wallpaper is bonded to a compressed chipboard panel and is coated on its facing side with the wall paint of brand "Herbol" of type "Zenit LG". Each test specimen is then pressed for 10 seconds with an applied pressure of 90 N per 10 $Cm^2$ of bond area, then stored at 40° C. for 15 minutes without application of force.

Thereafter the test panels are suspended horizontally so that the non-adhesive grip tab of the adhesive strips is pointing downward. With the aid of a clamp weighing 20 grams, a weight of 50 grams is fastened to the grip tab, so that a peel load of about 0.7 N acts orthogonally to the bond plane. The distance measured as the peel path is the peel travel in mm per day of the adhesive strip between a first point in time about 15 minutes after the beginning of the test and a second point in time after a further 24 h.

Tensile Strength // Maximum Elongation

Measurements are made, unless noted otherwise, in accordance with DIN 53504 using dumbbell specimens of size S3 and a separation speed of 300 mm/min.

Detachment Force (Stripping Force: Stripping Stress)

To determine the detachment force, also referred to as "stripping force", an adhesive sheet measuring 50 mm long by 20 mm wide, with a non-adhesive grip tab at its upper end, is bonded between two steel plates, arranged congruently with one another and measuring 50 mm×30 mm, as described in the "Tip shear stability time" paragraph but with applied pressures of 500 N in each case. At the bottom end of each steel plate there is a drill hole to accommodate an S-shaped steel hook. The bottom end of the steel hook bears a further steel plate, by means of which the test setup can be fixed in the lower clamping jaw of a tensile testing machine for the purpose of measurement. The bonds are stored at +40° C. for 24 h. After cooling to room temperature, the adhesive sheet strip is removed with a pulling speed of 1000 mm/min, parallel to the bond plane, and without contact with the edge regions of the two steel plates. During this procedure, the required detachment force is measured in N. The value reported is the mean value of the stripping stress (in $N/mm^2$), measured in the region in which the adhesive strip has undergone detachment over a bond length of between 10 mm and 40 mm from the steel substrates.

We claim:

1. A double-sided stretchable pressure sensitive adhesive sheet strip, which, when bonded to a substrate is detachable from said substrate by stretching, said pressure sensitive adhesive sheet strip being formed from a composition comprising a mixture of:
   a) a styrene block copolymer having a star-shaped structure and a molecular weight Mw of more than 300,000 g/mol, or having elastomer blocks which contain more than 30% by weight of 1,2-linked diene in their block structure, and which is crosslinkable by exposure to UV-light or electron beams, and
   b) one or more block copolymers having polyvinylaromatic blocks and elastomer blocks, the polyvinylaromatic block content being greater than 20% by weight, and
   c) one or more tackifier resins.

2. A single-sided stretchable pressure sensitive adhesive sheet strip, the side opposite the adhesive side being neutralized, which, when bonded to a substrate is detachable from said substrate by stretching, said pressure sensitive adhesive sheet strip being formed from a composition comprising a mixture of:
   a) a styrene block copolymer having a star-shaped structure and a molecular weight Mw of more than 300,000 g/mol, or having elastomer blocks which contain more than 30% by weight of 1,2-linked diene in their block structure, and which is crosslinkable by exposure to UV-light or electron beams, and
   b) one or more block copolymers having polyvinylaromatic blocks and elastomer blocks, the polyvinylaromatic block content being greater than 20% by weight, and
   c) one or more tackifier resins.

3. The adhesive as claimed in claim 1 or 2, wherein the block copolymers according to 1b) have polystyrene end blocks.

4. The adhesive as claimed in claim 1 or 2, wherein the block copolymers have a polyvinylaromatics fraction of from 20 to 40% by weight, and/or a triblock content of more than 60% by weight, or both.

5. The adhesive as claimed in claim 4, wherein said polyvinylaromatic fraction is from 25% to 35% by weight.

6. The adhesive as claimed in claim 4, wherein said triblock content is more than 75% by weight.

7. The adhesive as claimed in claim 1 or 2, wherein the styrene block copolymer according to 1a) comprises 1,2-linked polybutadiene or polyisoprene.

8. The adhesive as claimed in claim 1 or 2, wherein the styrene block copolymer is formed of styrene-butadiene block copolymer or styrene-isoprene block copolymer.

9. The adhesive as claimed in claim 1 or 2, wherein the styrene block copolymer has polydiene-containing elastomer blocks.

10. The adhesive as claimed in claim 9, wherein said polydiene-containing elastomer blocks are copolymers of two or more different 1,3-dienes.

11. The adhesive as claimed in claim 1 or 2, wherein the styrene block copolymer is functionalized.

12. The adhesive as claimed in claim 11, wherein said styrene block copolymer is functionalized by being maleic anhydride-modifid or silane-modified.

13. The adhesive as claimed in claim 1 or 2, comprising 20 to 70% by weight of styrene block copolymer, based on the weight of the adhesive.

14. The adhesive as claimed in claim 13, wherein said amount of styrene block copolymer is 30 to 60% by weight.

15. The adhesive as claimed in claim 14, wherein said amount of styrene block copolymer is 35 to 55% by weight.

16. The adhesive as claimed in claim 1 or 2, further comprising blend components selected from the group consisting of plasticizers, aging inhibitors, processing assistants, fillers, dyes, optical brighteners, and stabilizers.

17. The adhesive as claimed in claim 1 or 2, further comprising crosslinking promoters.

18. A method for producing a pressure sensitive adhesive sheet strip for providing a bond which can be parted again by stretching in the direction of the bond plane, which comprises applying the pressure sensitive adhesive of claim 1 or 3 to an elastically-stretchable backing.

19. A process for preparing the pressure sensitive adhesive for the pressure sensitive adhesive sheet strips according to claims 1 and 2, which comprises mixing
   (i) a styrene block copolymer having a star-shaped structure and a molecular weight $M_w$ of more than 300,000 g/mol, or having elastomer blocks containing more than 30% of 1,2-linked diene in the elastomer block structure, or both, and which is crosslinkable by exposure to UV-light or electron beams, and
   (ii) one or more block copolymers composed of polyvinylaromatic blocks and elastomer blocks, the polyvinylaromatic block content being greater than 20%, and
   (iii) one or more tackifier resins with elastomer blocks, and exposing the mixture to UV-light or electron beams.

* * * * *

UNITED STATES PATENT AND TRADEMARK OFFICE
CERTIFICATE OF CORRECTION

PATENT NO. : 6,887,919 B2
DATED : May 3, 2005
INVENTOR(S) : Krawinkel et al.

It is certified that error appears in the above-identified patent and that said Letters Patent is hereby corrected as shown below:

Column 9,
Line 6, "from kraton" should read -- from Kraton --.

Column 12,
Line 29, "anhydride-modifid" should read -- anhydride-modified --.
Lines 46-47, "claim 1 or 3 to an elastically-stretchable backing." should read
-- claim 1 or 2 to a stretchable backing. --.
Lines 48-50, "the pressure sensitive adhesive for the pressure sensitive adhesive street strips according to claims 1 and 2" should read -- a pressure sensitive adhesive for pressure sensitive adhesive sheet strips for providing a bond which can be parted by stretching in the direction of the bond plane --.

Signed and Sealed this

Twenty-fourth Day of January, 2006

JON W. DUDAS
*Director of the United States Patent and Trademark Office*

UNITED STATES PATENT AND TRADEMARK OFFICE
CERTIFICATE OF CORRECTION

PATENT NO.         : 6,887,919 B2
APPLICATION NO. : 10/357069
DATED                : May 3, 2005
INVENTOR(S)        : Krawinkel et al.

Page 1 of 1

It is certified that error appears in the above-identified patent and that said Letters Patent is hereby corrected as shown below:

Column 9,
Line 6, "from kraton" should read -- from Kraton --.

Column 12,
Line 29, "anhydride-modifid" should read -- anhydride-modified --.
Lines 46-47, "claim 1 or 3 to an elastically-stretchable backing." should read
-- claim 1 to a stretchable backing. --.
Lines 48-50, "the pressure sensitive adhesive for the pressure sensitive adhesive street strips according to claims 1 and 2" should read -- a pressure sensitive adhesive for pressure sensitive adhesive sheet strips for providing a bond which can be parted by stretching in the direction of the bond plane --.

This certificate supersedes the Certificate of Correction issued January 24, 2006.

Signed and Sealed this

Fifteenth Day of September, 2009

David J. Kappos
*Director of the United States Patent and Trademark Office*